United States Patent

Sauer

[11] Patent Number: 4,735,440
[45] Date of Patent: Apr. 5, 1988

[54] HOSE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 881,194

[22] Filed: Jul. 2, 1986

[30] Foreign Application Priority Data

Jul. 5, 1985 [DE] Fed. Rep. of Germany ... 8519523[U]

[51] Int. Cl.4 .............................................. F16L 17/02
[52] U.S. Cl. .................................... 285/110; 285/307; 285/319; 285/347; 285/915; 285/921
[58] Field of Search ............... 285/921, 319, 331, 257, 285/110, 307, 360, 376, 401

[56] References Cited

U.S. PATENT DOCUMENTS

| 825,354 | 7/1906 | Schnoor | 285/360 X |
|---|---|---|---|
| 3,245,701 | 4/1966 | Leopold et al. | 285/915 X |
| 3,455,579 | 7/1969 | Olliff et al. | 285/319 X |
| 3,588,149 | 6/1971 | Demler | 285/307 |
| 3,997,195 | 12/1976 | Bartholomew | 285/915 X |
| 4,063,760 | 12/1977 | Moreiras | 285/921 X |
| 4,214,779 | 7/1980 | Losell | 285/319 X |
| 4,293,138 | 10/1981 | Swantee | 285/110 X |
| 4,411,302 | 10/1983 | Kuypers | 285/319 X |
| 4,463,972 | 8/1984 | Weinhold | 285/331 X |
| 4,486,034 | 12/1984 | Sauer | 285/319 X |

Primary Examiner—Dave W. Arola
Attorney, Agent, or Firm—Peter K. Kontler

[57] ABSTRACT

The end portion of a hose is bonded to the front section of a tubular connector whose rear section surrounds the end portion of the hose and has two integral pallets whose teeth engage a circumferentially extending external rib of a nipple which receives the front section of the connector with the interposition of an annular sealing device. The rib has axially parallel passages which register with the teeth of the pallets during insertion of the front section of the connector into or during extraction of the front section of the connector from the nipple.

6 Claims, 3 Drawing Sheets

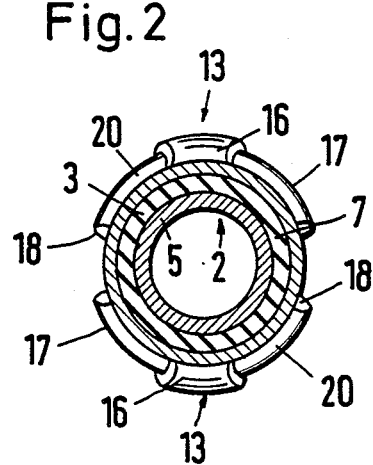
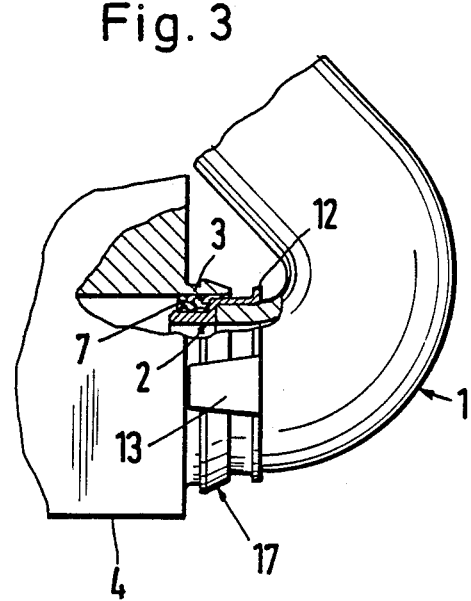

HOSE COUPLING

BACKGROUND OF THE INVENTION

The present invention relates to couplings in general, and more particularly to improvements in couplings for hoses and similar conduits. Still more particularly, the invention relates to improvements in couplings which can be used to separably but sealingly connect the end portion of a hose to a nipple, e.g., to a nipple under the hood of a motor vehicle.

It is known to provide the coupling between a hose and a nipple with an annular sealing device which is forced into the nipple to prevent uncontrolled escape of the conveyed gaseous or hydraulic fluid. It is also known to connect the end portion of the hose with a tubular connector which is surrounded by the sealing device and can be separably coupled to the nipple by one or more resilient hooks which are integral with a ring. The latter is placed around and is maintained in frictional engagement with the external surface of the tubular connector. The end portion of the hose is slipped onto the rear portion of the connector behind the ring, and the front portion of the connector has circumferential grooves for O-rings which constitute the sealing device and are forced into the nipple before the hooks engage a flank at the exterior of the nipple. The outer diameter of the front portion of the connector matches or approximates the inner diameter of the nipple. The external surface of the nipple is further provided with substantially wedge-like cams which can disengage the hooks from the flank in response to rotation of the nipple and the end portion of the hose relative to each other so that the connector can be withdrawn from the nipple.

A drawback of the just described conventional coupling is its complexity and high cost. Moreover, the insertion of O-rings into the nipple necessitates the exertion of a substantial force. Still further, and since the end portion of the hose is slipped onto the rear portion of the connector, the seal between the hose and the connector is likely to be interrupted in response to increasing pressure in the interior of the hose and/or nipple; in fact, the hose is likely to become completely separated from the connector. Such separation can also take place in response to the application of a pronounced pull in a direction to move the end portion of the hose away from the nipple which receives the front portion of the connector. Last but not least, the frictional engagement between the ring, which carries the hooks, and the connector is often insufficient to prevent separation of the ring and connector from each other when the connector is pulled in a direction away from the nipple and/or vice versa.

OBJECTS AND SUMMARY OF THE INVENTION

An object of the invention is to provide a novel and improved coupling which is more reliable and simpler than heretofore known couplings.

Another object of the invention is to provide a hose coupling which is not likely to permit escape of the confined fluid medium or media in response to the exertion of a pull in a direction to separate a hose or an analogous first conduit from the nipple of a second conduit or the like.

A further object of the invention is to provide a novel and improved method of separably coupling the end portion of a flexible hose to a nipple.

An additional object of the invention is to provide a device, machine or apparatus which embodies the above outlined coupling.

Still another object of the invention is to provide novel and improved means for coupling the end portion of a plastic hose to a metallic or plastic nipple or the like.

An additional object of the invention is to provide a novel and improved connector which can be used in the above outlined coupling.

A further object of the invention is to provide a novel and improved nipple which can be used in the above outlined coupling.

Another object of the invention is to provide a coupling which comprises a small number of simple and inexpensive parts and which can be used with advantage to establish a satisfactory seal between conduits serving to convey gaseous or hydraulic fluids at an elevated, medium or low pressure.

Still another object of the invention is to provide a novel and improved connection between the tubular component and the hose which is to be separably coupled to a nipple or the like.

A further object of the invention is to provide a coupling wherein the attachment of the end portion of a hose or another conduit to a nipple necessitates the exertion of a relatively small force in the axial direction of the nipple.

The improved hose coupling comprises a first conduit (such as a flexible hose) having a first end portion, a second conduit (e.g., a metallic or plastic pipe or container) having a second end portion (e.g., in the form of a nipple) with an external projection (such as a ring-shaped rib), and a tubular connector having a first section concentric with and rigidly secured to the end portion of the first conduit and extending into the end portion of the second conduit, and a second section surrounding the end portion of the first conduit and having at least one resilient pallet which releasably engages the projection of the end portion of the second conduit to hold the first section against extraction from the end portion of the second conduit. The coupling further comprises annular sealing means surrounding the first section of the connector in the end portion of the second conduit. The first section of the connector is preferably permanently bonded to the end portion of the first conduit, e.g., by an adhesive or by welding. To this end, the end portion of the first conduit and/or the first section of the connector can be made of a synthetic thermoplastic material.

The end portion of the first conduit can be made of an elastomeric material and is preferably received in the second section of the connector in compressed condition.

The pallet is preferably integral with that end portion of the second section of the connector which is remote from the sealing means. The pallet can include an arcuate portion which is integral with the second section of the connector and a second portion which is substantially parallel to the axis of the connector and has a front end portion provided with a protuberance (e.g., in the form of a tooth) which releasably engages the projection at the exterior of the end portion of the second conduit. The rear end portion of the second section can constitute a flange which flares radially outwardly away from the end portion of the first conduit, and the aforementioned second portion of the pallet extends forwardly from the flange. The width of the pallet (as measured in the circumferential direction of the connector) preferably decreases in a direction from the second toward the first section of the connector. The thickness of the second portion of the pallet (as measured radially of the connector) preferably decreases in a direction from the second toward the first section of the connector.

The internal surface of the end portion of the first conduit is or can be flush with the internal surface of the first section of the connector.

As mentioned above, the projection on the end portion of the second conduit can constitute a rib which extends in the circumferential direction of the second conduit. The rib is or can be formed with a first flank which extends substantially radially of the second conduit and is engaged by the pallet of the connector when the two conduits are sealingly connected to each other. The rib is preferably further formed with a second flank which tapers toward the common axis of the end portions of the two conduits in a direction away from the radially extending flank. The radially extending flank faces away from the first conduit. The rib is provided with at least one passage (one for each pallet), and the pallet has the aforementioned protuberance (e.g., a radially inwardly extending tooth) which must register with the passage preparatory to insertion of the first section of the connector into or preparatory to withdrawal of the first section of the connector from the end portion of the second conduit. Thus, the first conduit and the connector and/or the second conduit must be rotated until the protuberance registers with the passage of the rib before the two conduits can be sealingly connected to or separated from each other. The protuberance of the pallet can have a first flank which extends substantially radially of the connector and serves to engage the rib on the end portion of the second conduit, and a second flank which tapers radially outwardly in a direction away from the radial flank of the protuberance and away from the end portion of the first conduit.

The sealing means preferably comprises at least one external sealing lip engaging the end portion of the second conduit and/or at least one internal sealing lip engaging the first section of the connector. The connector can comprise two pallets which are disposed diametrically opposite each other.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a smaller-scale transverse sectional view as seen in direction of arrows from the line A—A of FIG. 1; and FIG. 3 is a smaller-scale fragmentary partly plan and partly horizontal sectional view of the coupling, with the hose-like first conduit of the coupling bent through an obtuse angle.

DESCRIPTION OF THE PREFERRED EMBODIMENTS

Figure 1:
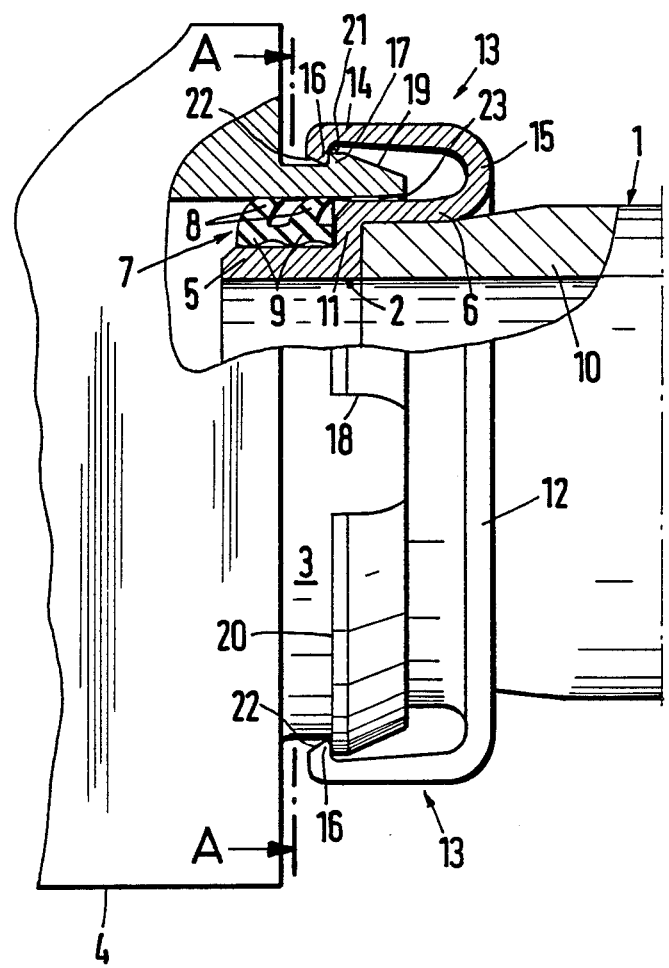
FIG. 1 is a fragmentary partly elevational and partly longitudinal sectional view of a fully assembled hose coupling which embodies one form of the present invention.

FIG. 1 shows a hose coupling which serves to separably connect the end portion 10 of a first conduit 1 (for example, a flexible hose which is made of a synthetic thermoplastic material) with a second conduit 4 which can form part of or constitute the radiator of a motor vehicle and has an end portion in the form of a nipple 3 which is coaxial with the end portion 10 as long as the hose 1 is coupled to the component 4. The coupling comprises an elastic annular sealing device 7 of rubber or another suitable elastomeric material, and a tubular connector 2 which is preferably made of a synthetic thermoplastic material capable of being welded or otherwise permanently bonded to the end portion 10 of the hose 1. The connector 2 has a first or front section 5 which is surrounded by the sealing device 7 and is received in the nipple 3, and a second or rear section 6 which surrounds the end portion 10 of the hose 1 and is integral with two forwardly extending resilient pallets 13 having elongated portions or arms 14 extending in parallelism with the axis of the connector 2 and carrying at their front ends radially inwardly extending tooth-like protuberances 16 releasably engaging the radially extending front flank 20 on a circumferentially extending rib-like projection 17 at the exterior of the nipple 3.

The sealing device 7 has one or more annular external sealing lips 8 which sealingly engage the internal surface of the nipple 3, and one or more annular internal sealing lips 9 which engage the external surface of the front section 5 of the connector 2. The sealing device 7 is inserted in prestressed condition so that it reliably seals the space between the section 5 and the nipple 3 against penetration of foreign matter into the path for the flow of a fluid from the component 4 into the hose 1 or vice versa, and that it reliably prevents the escape of such fluid from the hose 1 and/or component 4.

The outer diameter of the rear section 6 of the connector 2 equals or approximates the inner diameter of the nipple 3, and the foremost part of the section 6 actually extends into the rearmost part of the nipple 3 immediately behind the sealing device 7. The inner diameter of the section 6 is somewhat smaller than the outer diameter of the end portion 10 in unstressed condition of the hose 1. Therefore, the end portion 10 of the hose 1 (which is made of an elastomeric synthetic thermoplastic material) must be adequately compressed in order to fit into the section 6 of the connector 2. The front end face of the end portion 10 of the hose 1 abuts and is welded, adhesively connected or otherwise permanently bonded to a web 11 at the rear end of the front section 5 of the connector 2. The diameter of the internal surface of the front section 5 matches or closely approximates the inner diameter of the end portion 10 when the latter is inserted into the rear section 6 of the connector 2. This is desirable and advantageous because neither the internal surface of the end portion 10 nor the internal surface of the section 5 can offer undesirable resistance to the flow of a stream of fluid medium from the component 4 into the hose 1 or vice versa. The connection between the section 5 and the end portion 10 is leakproof to thus ensure that no fluid can flow from the interior of the hose 1 and/or component 4, along the front end face of the end portion 10 and along the internal surface of the section 6 or in the opposite direction.

For example, the end portion 10 of the hose 1 can be welded to the web 11 of the section 5 after adequate heating of such parts to the melting point of their material or, alternatively, the web 11 can be bonded to the front end face of the end portion 10 by a suitable adhesive. It is further within the purview of the invention to more or less permanently bond the external surface of the end portion 10 to the internal surface of the section 6 in addition to or in lieu of the establishment of a bond between the front end face of the end portion 10 and the web 11 at the rear end of the section 5. If the hose 1 is made of rubber, the adhesive which is used to bond the front end face of the end portion 10 to the web 11 can constitute a hotmelt which is activated during vulcanizing of the hose 1 and remains activated during introduction of the end portion 10 into the section 6 of the connector 2. This ensures that the end portion 10 and/or the section 5 need not be heated again for the sole purpose of establishing a permanent bond between the hose 1 and the connector 2.

The rear end portion 12 of the section 6 comprises or constitutes a radially outwardly flaring annular flange 15 which is integral with the arcuate rear end portions of the pallets 13. The pallets 13 are disposed diametrically opposite each other with reference to the axis of the connector 2 and their portions or arms 14 are parallel to the axis of the connector and to the common axis of the nipple 3 and end portion 10. The thickness of the portions 14 of the pallets 13 (as measured radially of the connector 2) decreases in a direction from the rear end portion 12 of the section 6 toward the front section 5. FIG. 3 shows that the width of the portions 14 (as measured in the circumferential direction of the connector 2) decreases in a direction from the rear end portion 12 of the section 6 toward the component 4, i.e., away from the hose 1.

The projection 17 extends circumferentially of the external surface of the nipple 3 and has two axially parallel passages 18, one for each of the pallets 13. The projection 17 has the aforementioned radially extending flank 20 which faces away from the hose 1 and is engaged by the radially extending flanks 21 of the protuberances 16 on the pallets 13 when the component 4 is properly coupled to the hose 1. A second flank 19 of the projection 17 tapers toward the common axis of the end portion 10 and nipple 3 in a direction away from the radial flank 20. The protuberances 16 have forwardly sloping flanks 22 which extend outwardly from the respective radial flanks 21 to facilitate slipping of the pallets 13 onto the flank 19 and the radially outward movement of the protuberances 16 until they reach and advance beyond the flank 20 to thereupon move radially inwardly and place their radial flanks 21 into engagement with the flank 20 of the projection 17 on the nipple 3. The inclination of each flank 22 with reference to the axis of the connector 2 can equal or approximate 30 degrees. The inclination of the flank 19 of the projection 17 with reference to the axis of the connector 2 can equal or approximate 21 degrees.

The rearmost portion 23 of the internal surface of the nipple 3 flares outwardly toward the open end of the nipple to allow for more convenient insertion and centering of the section 6 during introduction of the section 6 into the nipple immediately following insertion of the sealing device 7.

In order to sealingly couple the end portion 10 of the hose 1 to the nipple 3 of the component 4, the sealing device 7 is compressed radially to enter the space within the confines of the end portion 23 of the internal surface of the nipple 3 before the end portion 10 can be pushed into the nipple so that the sealing lips 8 at the exterior of the sealing device 7 slide along the internal surface of the nipple 3 and along the internal surface of the component 4 until the protuberances 16 of the pallets 13 reach and advance beyond the projection 17 at the exterior of the nipple. The front portion of the section 6 enters the nipple 3 before the radial flanks 21 of the protuberances 16 are free to move radially inwardly in order to engage the adjacent portions of the radial flank 20 on the projection 17. The tapering end portion 23 of the internal surface of the nipple 3 facilitates introduction of the sealing device 7 and of the front portion of the section 6 into the nipple.

The protuberances 16 of the pallets 13 move radially outwardly and away from each other during insertion of the sealing device 7 and front portion of the section 6 into the nipple 3, and the innate elasticity of the pallets 13 suffices to ensure that the flanks 21 of the protuberances 16 automatically snap behind and engage the flank 20 of the projection 17 as soon as the sealing device 7 and the front portion of the section 6 are properly received in the nipple 3. Introduction of the sealing device 7 and of the front portion of the section 6 into the nipple 3 can be effected with the exertion of a relatively small effort because the portions 14 and hence the lever arms of the pallets 13 are rather long. A reduction of the thickness of portions 14 in a direction away from the rear end portion 12 of the section 6 also contributes to the ease of application of the pallets 13 over the nipple 3 until the protuberances 16 are free to move radially inwardly and to properly engage the flank 20 of the projection 17. The taper of the pallets 13 (as seen in the circumferential direction of the connector 2 and as shown in FIG. 3) also contributes to a reduction of the force which is required to move the pallets 13 along the nipple 3 until the protuberances 16 can move radially inwardly in order to engage the projection 17 so as to releasably hold the hose 1 in sealing engagement with the component 4. Still further, the outwardly flaring flanks 22 of the protuberances 16 also contribute to a reduction of the aforediscussed force.

If the hose 1 is to be separated from the component 4, the end portion 10 is rotated relative to the nipple 3 and/or vice versa until each protuberance 16 registers with a passage 18 so that the sealing device 7 and the front end portion of the section 6 can be extracted from the nipple 3. The arrangement may be such that each of the two protuberances 16 is normally held midway between the passages 18 of the projection 17 so that the end portion 10 and/or the nipple 3 must be rotated through an angle of approximately 90 degrees before the hose 1 can be separated from the component 4. If it is undesirable or impractical to rotate the end portion 10 relative to the nipple 3 and/or vice versa (e.g., because the hose 1 offers little resistance to torsional stresses), the operator can use a simple tool in order to move the protuberances 16 of the pallets 13 radially outwardly so as to disengage the flanks 21 from the flank 20 and to thus allow for separation of the end portion 10 from the nipple 3. For example, the working end of a screwdriver can be used to disengage the protuberances 16 from the projection 17.

The resistance of the hose 1 to torsional stresses (twisting) can be readily selected in such a way that the end portion 10 and the connector 2 can be rotated relative to the nipple 3 through 90 degrees, while the other end portion of the hose 1 is held against angular movement, so as to place each protuberance 16 into register with a passage 18 and to thus allow for axial shifting of the end portion 10 relative to the nipple 3 and/or vice versa in order to permit separation of the end portion 10, connector 2 and sealing device 7 from the nipple 3. Analogously, one end portion of a readily twistable hose 1 can be coupled to the nipple 3, while the other end portion of the hose is held against angular movement, by the simple expedient of twisting the hose until the protuberances 16 of the pallets 13 register with the respective passages 18 so that the nipple 3 can be slipped onto the sealing device 7 and onto the front end portion of the section 6 before the hose is untwisted so that the flanks 21 of the protuberances 16 can engage the radial flank 20 of the projection 17.

An important advantage of the improved coupling over conventional couplings wherein the end portion of the hose must be surrounded by a circumferentially extending ring before the end portion of the hose is slipped onto a nipple is that the outer diameter of the end portion 10 of the hose 1 can fluctuate within a wide range (i.e., such outer diameter can deviate from an optimum outer diameter) without adversely affecting the quality of the coupling. This will be readily appreciated by bearing in mind that the elastically deformable end portion 10 of the illustrated hose 1 can be readily forced into the rear section 6 of the connector 2 even if the outer diameter of the end portion 10 is much greater or much smaller than an optimum or standard outer diameter. A satisfactory seal between the connector 2 and the hose 1 is established between the front end face of the end portion 10 and the web 11 of the front section 5 and not necessarily between the external surface of the end portion 10 and the internal surface of the section 6.

Another important advantage of the improved coupling is that the seal between the hose 1 and the component 4 is satisfactory even if the outer diameter of the front portion of the section 6 does not match or closely approximate the inner diameter of the nipple 3. For example, the inner diameter of the nipple 3 can exceed the outer diameter of the front portion of the section 6, as long as the external lips 8 properly engage the internal surface of the nipple 3 and component 4 when the flanks 21 of the protuberances 16 engage the flank 20 of the projection 17. The sealing action takes place along the front end face of the end portion 10 and along the exterior of the sealing device 7.

The feature that the end portion 10 of the hose 1 extends into the rear section 6 of the connector 2 renders it possible to shorten the length of the connector without risking untimely separation of the hose from the connector. The feature that the end portion 10 is bonded to the web 11 of the front section 5 of the connector 2 allows for a further reduction of the axial length of the connector (because the extent to which the end portion 10 protrudes into the section 6 is of no consequence or of little consequence as far as the establishment of a seal between the connector and the hose is concerned); at the same time, such bonding of the end portion 10 to the connector 2 greatly reduces the likelihood of leakage, even in response to the application of substantial axial stresses which tend to extract the end portion 10 from the section 6. The bond between the end portion 10 and the section 6 is much more reliable than the frictional engagement between the internal surface of the end portion of a hose and the external surface of a connector in the aforediscussed conventional hose coupling.

The placing of the sealing device 7 around the smaller-diameter front section 5 of the connector 2 contributes to convenience and simplicity of the establishment of a seal between the section 5 and the nipple 3. The insertion of the sealing device 7 into the nipple 3 is further simplified due to the provision of the outwardly flaring portion 23 of the internal surface of the nipple 3 within the confines of the projection 17 or rearwardly of such projection. The provision of deformable sealing lips 8 at the exterior of the sealing device 7 also contributes to more convenient insertion of the sealing device and section 5 into the nipple 3. This is important in certain automated plants wherein the coupling must be assembled or taken apart by robots. Examples of such plants are automobile assembling plants wherein robots could be used with advantage to connect hoses to the radiators of motor vehicles. The sealing device 7 can yield in several directions to permit attachment of the connector 2 to the nipple 3 with the exertion of a small force.

The feature that the pallets 13 are integral with the connector 2 contributes to reliability of the coupling, and the feature that the pallets 13 are integral with the rear end portion 12 of the rear section 6 of the connector contributes to the ease of separably connecting the protuberances 16 with the projection 17 because the flexing of pallets during travel of the protuberances 17 along the flank 19 takes place at a considerable distance from the locations where the rear end portions of the pallets are integrated into the flange 15 of the section 6. The assembly of the coupling takes less time than the assembly of the aforediscussed conventional coupling because it is not necessary to connect the pallets 13 with the section 6 before the section 5 is introduced into the nipple 3.

The bond between the end portion 10 of the hose 1 and the web 11 of the section 5 can be readily established upon introduction of the end portion 10 into the section 6 by the simple expedient of heating the preferably thermoplastic material of the connector 2 and hose in the region of the web 11 to the melting point and of subsequently cooling the freshly established bond. Such connections can stand pronounced axial and/or torsional stresses. Heating of the end portion 10 and web 11 can be dispensed with if the bond between the hose 1 and the connector 2 is established by a suitable adhesive which need not be activated by heating and can set without the application of heat. As mentioned above, the bond between the end portion 10 and the connector 2 can be established during vulcanizing of the hose 1.

The application of at least some radial pressure upon the end portion 10 during insertion into the section 6 is desirable and advantageous because friction between the external surface of the end portion 10 and the internal surface of the section 6 contributes to the establishment of a more reliable seal and to greater resistance of the end portion 10 and connector 2 to separation from each other in response to the application of axial stresses.

The outwardly flaring flange 15 at the rear end of the section 6 and the provision of pallets 13 with radially outwardly bent substantially semicircular rear end portions renders it possible to readily center the end portion 10 prior to introduction into the section 6. Moreover, the flange 15 reduces the likelihood of buckling of the hose 1 immediately behind the section 6 when the hose is flexed (e.g., in a manner as shown in FIG. 3). The flange 15 also reduces the likelihood of damage to the coupling in response to repeated oscillatory and/or other stray movements of the entire coupling or of the hose 1 when the coupling is installed in a motor vehicle. The provision of pallets 13 with arcuate rear end portions reduces the likelihood of undesirable and excessive flexing in the region of the flange 15, not only during attachment of the connector 2 to the nipple 3 but also when the hose 1 is to be detached from the component 4, e.g., with assistance from a screwdriver or another tool which is used in lieu of rotating the hose so as to move the protuberances 16 into register with the channels 18.

The utilization of pallets 13 whose portions 14 taper in a direction toward the respective protuberances 16 in the radial and/or in the circumferential direction of the connector 2 constitutes a desirable optional feature of the improved coupling. Such design of the pallets contributes to savings in material and enhances the flexibility of the pallets. All that counts is to ensure that the pallets 13 can be readily flexed in response to axial movement of the nipple 3 and end portion 10 in a direction to move the flanks 21 toward engagement with the flank 20 and to ensure that the pallets are sufficiently rigid to reliably hold their protuberances 16 in engagement with the projection 17 in fully assembled condition of the coupling.

The nipple 3 can be provided with a projection whose configuration departs considerably from the shape of the rib 17. The rib 17 is preferred at this time because it is simple but nevertheless capable of establishing a reliable connection with the pallets 13. The flank 19 facilitates and promotes radial movements of the protuberances 16 during axial movement of the nipple 3 and/or end portion 10 in a direction to engage the flanks 21 with the flank 20.

The passages 18 are desirable and advantageous for convenient separation of the connector 2 from the nipple 3. Furthermore, such passages can facilitate practically effortless attachment of the connector 2 to the nipple 3. Thus, the section 5 and the sealing device 7 can be introduced into the nipple 3 while the protuberances 16 register with the passages 18, i.e., the protuberances 16 need not slide along the conical flank 19. When the flanks 21 are moved beyond the flank 20, the connector 2 is rotated relative to the nipple 3 and/or vice versa so as to move the flanks 21 into engagement with the flank 20 on the projection 17 and to thus establish a reliable connection between the hose 1 and the component 4.

The sealing lips 8 and/or 9 are optional but desirable because they facilitate the insertion of the sealing device 7 into the nipple 3 and the insertion of the section 5 into the sealing device while ensuring the establishment of a leakproof seal.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling comprising a first conduit having a first end portion; a second conduit having a second end portion with an external projection; a tubular connector having a first section concentric with and permanently bonded to said first end portion and extending into said second end portion, and a second section surrounding said first end portion and having at least one pallet releasably engaging said projection to hold said first section against extraction from said second end portion, said first end portion and said first section having coaxial internal surfaces with substantially identical diameters, the width of said pallet in the circumferential direction of said conduits decreasing in a direction from said second toward said first section, at least one of the parts including said first end portion and said first section containing a synthetic thermoplastic material, said first end portion containing an elastomeric material and being received in said second section in compressed condition, said second section having an annular flange which flares radially outwardly away from said first end portion and is integral with said pallet, said projection including a circumferentially extending rib having at least one passage and said pallet having an inner side provided with a tooth constituting a protuberance registerable with said passage to facilitate insertion of said first section into or extraction of said first section from said second end portion, said pallet including an arcuate portion which is integral with the end portion of said second section and a second portion extending in substantial parallelism with the axis of said connector and having an end portion provided with said protuberance, said protuberance engaging said rib and the thickness of the second portion of said pallet decreasing radially of said conduits in a direction from said second toward said first section, said rib having a first flank extending substantially radially of said second end portion and facing away from said first conduit and a second flank which tapers toward the common axis of said end portions in a direction away from said first flank, said protuberance having a first flank extending substantially radially of said conduits and engageable with said rib and a second flank tapering radially outwardly in a direction away from said first end portion; and annular sealing means remote from said flange and surrounding said first section in said second end portion, said sealing means comprising at least one external sealing lip engaging said second end portion.

2. The coupling of claim 1, wherein said first end portion is secured to said first section by an adhesive.

3. The coupling of claim 1, wherein said sealing means further comprises at least one internal sealing lip engaging the first section of said connector.

4. The coupling of claim 1, wherein said first conduit is a flexible hose and said second conduit has a nipple constituting said second end portion.

5. The coupling of claim 1, wherein said connector comprises two pallets which are disposed diametrically opposite each other.

6. The coupling of claim 1, wherein said pallet is resilient.

* * * * *